(12) United States Patent
Dettinger et al.

(10) Patent No.: US 7,844,623 B2
(45) Date of Patent: *Nov. 30, 2010

(54) METHOD TO PROVIDE MANAGEMENT OF QUERY OUTPUT

(75) Inventors: Richard D. Dettinger, Rochester, MN (US); Peter J. Johnson, Rochester, MN (US); Dan P. Kolz, Rochester, MN (US); Shannon E. Wenzel, Colby, WI (US)

(73) Assignee: International Business Machines Corporation, Armonk, NY (US)

( * ) Notice: Subject to any disclaimer, the term of this patent is extended or adjusted under 35 U.S.C. 154(b) by 369 days.

This patent is subject to a terminal disclaimer.

(21) Appl. No.: 12/017,373

(22) Filed: Jan. 22, 2008

(65) Prior Publication Data

US 2008/0140612 A1 Jun. 12, 2008

Related U.S. Application Data

(63) Continuation of application No. 10/870,378, filed on Jun. 17, 2004, now Pat. No. 7,370,030.

(51) Int. Cl.
G06F 17/30 (2006.01)
(52) U.S. Cl. .................... 707/770; 707/764
(58) Field of Classification Search .......... 707/999.003, 707/999.004, 999.107, 764, 770
See application file for complete search history.

(56) References Cited

U.S. PATENT DOCUMENTS

| 5,495,606 A | 2/1996 | Borden et al. |
| 5,590,319 A | 12/1996 | Cohen et al. |
| 5,742,806 A * | 4/1998 | Reiner et al. ............ 1/1 |
| 5,841,437 A | 11/1998 | Fishkin et al. |
| 5,926,807 A | 7/1999 | Peltonen et al. |
| 6,006,225 A | 12/1999 | Bowman et al. |
| 6,256,621 B1 * | 7/2001 | Tsuchida et al. ............ 1/1 |
| 6,289,334 B1 * | 9/2001 | Reiner et al. ............ 1/1 |
| 6,470,333 B1 | 10/2002 | Baclawski |
| 6,553,368 B2 | 4/2003 | Martin et al. |
| 6,560,595 B1 | 5/2003 | Sanders et al. |
| 6,697,818 B2 | 2/2004 | Li et al. |
| 6,725,227 B1 | 4/2004 | Li |
| 6,816,854 B2 | 11/2004 | Reiner et al. |
| 6,850,927 B1 | 2/2005 | Hsu |
| 6,978,264 B2 | 12/2005 | Chandrasekar et al. |
| 6,996,558 B2 | 2/2006 | Dettinger et al. |
| 7,149,731 B2 * | 12/2006 | Dettinger et al. ............ 1/1 |
| 7,333,982 B2 * | 2/2008 | Bakalash et al. ............ 1/1 |
| 7,370,030 B2 * | 5/2008 | Dettinger et al. ............ 1/1 |
| 7,673,344 B1 * | 3/2010 | Rowney et al. ............ 726/26 |
| 2002/0198891 A1 | 12/2002 | Li et al. |
| 2004/0148278 A1 | 7/2004 | Milo et al. |

FOREIGN PATENT DOCUMENTS

WO 03105028 A2 12/2003

* cited by examiner

*Primary Examiner*—Leslie Wong
(74) *Attorney, Agent, or Firm*—Patterson & Sheridan, LLP

(57) ABSTRACT

System and article of manufacture for processing queries that are executed against a database. In one embodiment, the database environment imposes a limit on the number of columns capable of being returned for a single query. Accordingly, a single query is replicated to produce N sub-queries, each selecting a portion of the total number of result fields specified in the single query.

11 Claims, 7 Drawing Sheets

METHOD TO PROVIDE MANAGEMENT OF QUERY OUTPUT

CROSS-REFERENCE TO RELATED APPLICATIONS

This application is a continuation of U.S. patent application Ser. No. 10/870,378 filed Jun. 17, 2004, U.S. Pat. No. 7,370,030 which is herein incorporated by reference in its entirety.

BACKGROUND OF THE INVENTION

1. Field of the Invention

The present invention generally relates to data processing in databases and, more particularly, to constructing queries capable of returning classified information related to data in a database.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, a DBMS can be structured to support a variety of different types of operations for a requesting entity (e.g., an application, the operating system or an end user). Such operations can be configured to retrieve, add, modify and delete information being stored and managed by the DBMS. Standard database access methods support these operations using high-level query languages, such as the Structured Query Language (SQL). The term "query" denominates a set of commands that cause execution of operations for processing data from a stored database. For instance, SQL supports four types of query operations, i.e., SELECT, INSERT, UPDATE and DELETE. A SELECT operation retrieves data from a database, an INSERT operation adds new data to a database, an UPDATE operation modifies data in a database and a DELETE operation removes data from a database.

To retrieve data from a database, e.g., using a SELECT operation in the case of an SQL query, one or more result fields are specified. These result fields are the fields the user is requesting data for. For example, consider the following SQL query issued against an EMPLOYEE database table:

---
SELECT EMP_NO, FIRSTNAME, MIDINIT, LASTNAME,
FROM EMPLOYEE
WHERE Age >65
---

In this example, the SELECT statement specifies a unique identification number (EMP_NO), a first name (FIRSTNAME), and a last name (LASTNAME). The SQL query further includes a FROM statement indicating that the result fields are found in the EMPLOYEE table. Moreover, the SQL query includes a WHERE clause which specifies the conditions of query. In this example, only one condition is specified, i.e., that the employees for which records are returned be over 65 years of age.

In the example above, only three result fields are requested. Such a request is within the limits of conventional database applications. However, database applications do have limits on the number of columns that can be returned for given request, and some environments are now pushing those limits. One environment in which the limits of databases are being strained is in research where data in a tabular format is required for input into analysis routines. For example, MAGE, or Microarray Gene Expression, is a method of obtaining information about genes. One of the central principles of MAGE is that data objects are regarded as 3-dimensional matrices, with bioassays (experimental steps or conditions) along a first dimension, design elements (spots) along a second dimension and quantitation types (e.g., signal intensity, background intensity) along a third dimension. Bioassay data objects can be represented in one of two ways: as a set of vectors (in the form: value, dimension1, dimension2, dimension3), or as a 3-D matrix (BioDataCube). Transformations (e.g., filtering, normalization) can be applied to one or more bioassay data objects, resulting in derived data objects. A transformation involves computing values of the resulting 3-D matrix from the values of source matrices, and it also transforms dimensions.

Storing multiple Microarray Gene Expressions that have Bioassay objects which exploit the three dimensions of the matrix in conjunction with multiple steps of each experiment which produce Bioassay data that is normalized could result in massive amounts of data stored over many columns and tables. Query statements could be composed to select excessive numbers of columns in order to mine and search the results of such analysis results.

The limit placed on database applications' abilities to return large numbers of columns is a substantial limitation that prevents certain functions from being performed. As the need to store and retrieve more and more data increases, this limitation will render database applications in capable of performing critical functions, and therefore require implementation of alternative solutions.

Therefore, there is a need for a database environment capable of accommodating requests for voluminous data.

SUMMARY OF THE INVENTION

The present invention is generally directed to a method, system and article of manufacture for managing the execution of queries against a database in a manner that accommodates requests for voluminous data (e.g., a numbers of columns and/or rows in excess of what can be returned for a single query).

One embodiment provides a method of executing queries against a database. A query is received from a requesting entity. The query includes a plurality of result fields to be returned following execution of the query. A plurality of sub-queries is created based on a limitation on results capable of being returned for the query, wherein each sub-query includes only a portion of the result fields and wherein the portions collectively include all of the result fields of the query. The plurality of sub-queries is then executed in lieu of the query. A separate result set is received for each of the sub-queries and returned to the requesting entity.

Another embodiment provides a method of processing queries containing a number of result fields in excess of a number of columns capable of being returned. A query comprising a plurality of result fields to be returned following execution of the query is received from a requesting entity. A determination is made whether the number of the plurality of result fields exceeds a maximum number of columns capable of being returned for a single query. If so, a plurality of sub-queries is created, wherein each sub-query includes only a portion of the result fields, not greater than the maximum number of columns capable of being returned, and wherein the portions collectively include all of the result fields of the query.

Yet another embodiment provides a computer-readable medium containing a program which, when executed by a processor, performs an operation of processing queries containing a number of result fields in excess of a number of columns capable of being returned. The operation includes receiving, from a requesting entity, a query comprising a plurality of result fields to be returned following execution of the query; determining whether the number of the plurality of result fields exceeds a maximum number of columns capable of being returned for a single query; and if so, creating a plurality of sub-queries, wherein each sub-query includes only a portion of the result fields, not greater than the maximum number of columns capable of being returned, and wherein the portions collectively include all of the result fields of the query.

Still another embodiment provides a computer-readable medium containing a program which, when executed by a processor, performs a process for executing queries against a database. The process includes receiving an abstract query including at least a plurality of result fields, each corresponding to a logical field definition of a data abstraction model abstractly describing the data in the database. If the number of the plurality of result fields exceeds a maximum number of columns capable of being returned for a single query, a plurality of sub-queries is created, wherein each sub-query includes only a portion of the result fields, not greater than the maximum number of columns capable of being returned, and wherein the portions collectively include all of the result fields of the query.

Still another embodiment provides a computer including a user interface for composing queries, a query manager and a mapping algorithm. The query manager is configured to receive a query composed in the user interface and including a plurality of result fields to be returned following execution of the query; determine whether the number of the plurality of result fields exceeds a maximum number of columns capable of being returned for a single query; and if so, create a plurality of sub-queries, wherein each sub-query includes only a portion of the result fields, not greater than the maximum number of columns capable of being returned, and wherein the portions collectively include all of the result fields of the query. The mapping algorithm maps the result fields of the query to columns in result sets returned for the plurality of sub-queries.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
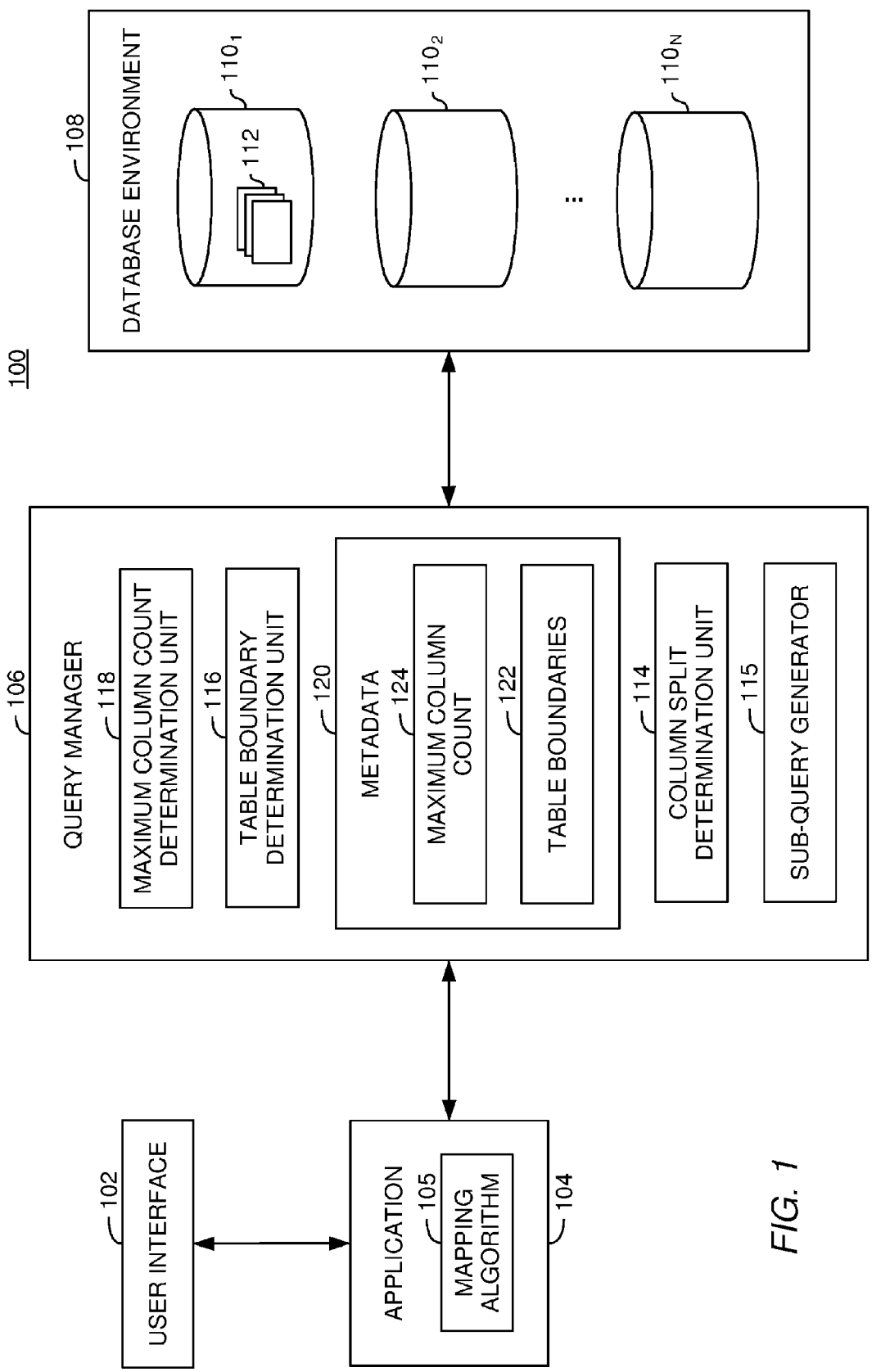
FIG. 1 is a relational view of software components in one embodiment.

The present invention is generally directed to a method, system and article of manufacture for managing the execution of queries against a database in a manner that accommodates requests for voluminous data (e.g., a numbers of columns and/or rows in excess of what can be returned for a single query). In one embodiment, the database environment imposes a limit on the number of columns capable of being returned for a single query. Accordingly, a single query is replicated to produce N sub-queries, each selecting a portion of the total number of result fields specified in the single query.

Data Processing Environment

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Embodiments of the invention can be implemented in a hardware/software configuration including at least one networked client computer and at least one server computer.

Furthermore, embodiments of the present invention can apply to any comparable hardware configuration, regardless of whether the computer systems are complicated, multi-user computing apparatus, single-user workstations, or network appliances that do not have non-volatile storage of their own. Further, it is understood that while reference may be made to particular query languages, including SQL, the invention is not limited to a particular language, standard or version. Accordingly, persons skilled in the art will recognize that the invention is adaptable to other query languages and that the invention is also adaptable to future changes in a particular query language as well as to other query languages presently unknown.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

Referring now to FIG. 1, a relational view of components in an embodiment of a processing environment 100 is illustrated. Generally, the components shown in FIG. 1 may be implemented in any combination of software and/or hardware. In a particular embodiment, the components shown are implemented as software and reside on a computer system.

The software components of FIG. 1 include a user interface 102, an application 104, a query manager 106, and a database environment 108. Although only single instances of each of the components shown, is contemplated that the processing environment 100 may include one or more of any of the components shown. It is also contemplated that the processing environment 100 may include additional components not shown.

The user interface 102 may be of any type allowing users to interact with the application 104. In general, the user interface 102 is configured to allow users to submit queries against the database environment 108. To this end, the user interface 102 may allow users to compose original queries, or retrieve stored queries (e.g., from the database environment 108). It is also contemplated that queries may be initiated by the application 104, such as where queries are scheduled to be run periodically according to a predefined schedule. Is also contemplated that the application 104 may expose (through the user interface 102) one or more analysis routines adapted to, for example, perform predefined analyses on query results.

Queries issued by the application 104 are executed against one or more databases $110_1$, $110_2$, . . . $110_N$ (collectively referred to as "databases 110") of the database environment 108. In one embodiment, the databases 110 are relational databases each containing a plurality of tables 112 (shown only contained within the database $110_1$ for simplicity). Accordingly, the tables 112 may be queried by SQL queries. However, other query languages, known or unknown, are contemplated.

In one embodiment, queries issued for execution against the database environment 108 are received and processed by the query manager 106. In a particular embodiment, the query manager 106 is, or includes, a query engine. Illustratively, the query manager 106 is configured with a plurality of processing units 114, 115, 116, 118 and metadata 120. However, in other embodiments the processing units 114, 116, 118 and/or metadata 120 reside at different locations. One of the processing units is a column split determination unit 114. The column split determination unit 114 operates to split the result fields of a given query into two or more result field subsets. The two or more result field subsets are then included in respective sub-queries generated by the sub-query generator 115. In one embodiment, a "sub-query" is a copy of the given query, but containing only a subset of the result fields specified in the given query. In one embodiment, queries are split into sub-queries on the basis of the table boundaries of the tables in which the result fields of the query are located. Accordingly, the query manager 106 may contain table boundaries metadata 122 describing the table boundaries of the tables 112 located in the various databases of the database environment 108. Alternatively, the query manager 106 may be configured with a table boundaries determination unit 116 which operates to interrogate the tables 112 in the database environment 108 and determine the table boundaries. In one embodiment, queries are split into sub-queries on the basis of the maximum number of columns capable of being returned for a given query (referred to herein as the "maximum column count"). The maximum column count may be, for example, an inherent limitation of the query language protocol. Where queries are split on the basis of a maximum column count, the query manager 106 may include maximum column count metadata 124. Alternatively, the query manager 106 may be configured with a maximum column count determination unit 118 which operates to determine the maximum column count. For example, maximum column count metadata may be maintained within the database environment 108 and retrieved via a metadata call, such as Java's JDBC's DatabaseMetaData.getMaxColumnsInSelect call.

Accordingly, it should be understood that the metadata and determination units shown as part of the query manager 106 are not collectively needed in every embodiment. For example, where the query manager 106 includes the table boundaries metadata 122, the table boundary determination unit 116 is not needed. Likewise, when the query manager 106 includes the maximum column count metadata, the maximum column count determination unit 118 is not needed. Thus, the determination units and metadata are shown merely to illustrate metadata and components that may be provided for various embodiments.

Figure 2:
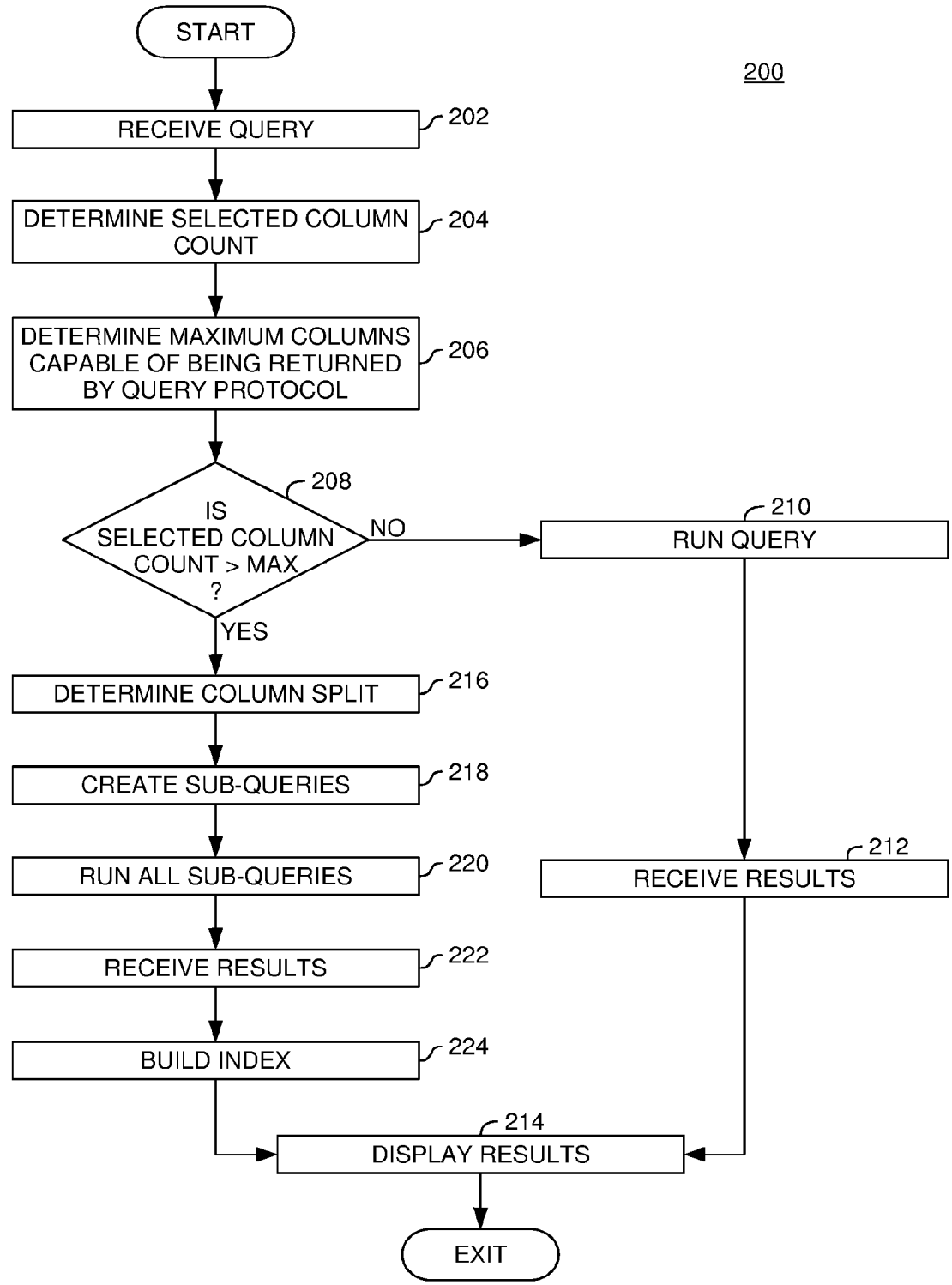
FIG. 2 is a flowchart illustrating one embodiment of a method for selectively creating sub-queries.

Referring now to FIG. 2 one embodiment of a method 200 for processing queries is shown. In one embodiment, the method 200 is carried out by the query manager 106 and/or the application 104. The method 200 is initiated (at step 202) when the query manager 106 receives a query from the application 104. The query manager 106 then determines the selected column count (step 204). That is, the received query is examined to determine the number of result fields contained therein. The query manager 106 then determines (step 206) the maximum columns capable of being returned, i.e., the maximum column count, and then determines whether the selected column count exceeds the maximum column count (step 208). If not, the query is run (step 210). Upon receiving the query results (212), the results may be displayed to the user (step 214).

If the selected column count does exceed the maximum column count (step 208), the query manager 106 determines a column split (step 216). That is, the column split determination unit 114 is invoked to determine result field subsets of the collective result fields contained in the received query, wherein each result field subset is to be contained in a separate sub-query. The sub-queries are then generated by the sub-query generator 115 (at step 218). Each of the generated sub-queries is then run against the database environment (step 220). Upon receiving the individual result sets for each sub-query (step 222) an index is built mapping each column of the individual result sets (step 224). More generally, the index may be built at any time (i.e., before or after execution of the sub-queries) after generation of the sub-queries. In one embodiment, the index is built by a mapping algorithm 105 of the application 104. The purpose of the index is to maintain a map of which result fields (columns) are in each result set, thereby allowing the query manager to output the result fields in the order appropriate to the algorithm 105. The view of the data, however, is algorithm independent. That is, regardless of the index implemented by the algorithm 105, the user may view the data differently, i.e., in a different order. In one embodiment, it is contemplated that the order of the result fields, as viewed by the user, is user-configurable (i.e., user-selectable).

Figure 3:
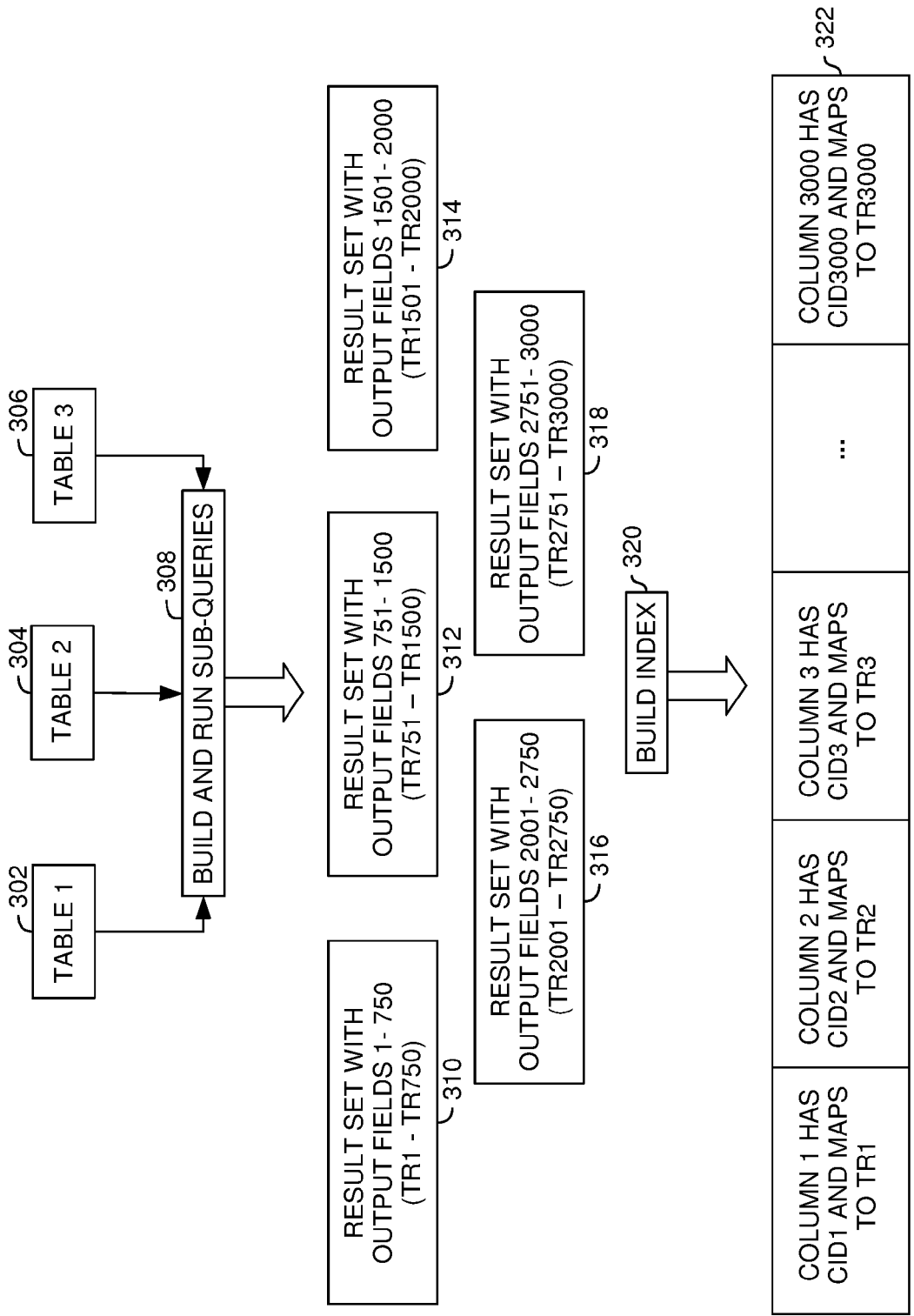
FIG. 3 is a block diagram illustrating one embodiment of a method for selectively creating sub-queries and the mapping the result fields of the sub-queries from the base query to an output view.

A particular example implementing the method 200 of FIG. 2 is now described with reference to FIG. 3. FIG. 3 illustrates three tables, Table 1 (302), Table 2 (304), Table 3 (306), from which result fields are selected for a given query having the following form:

| | |
|---|---|
| SELECT: | T1_1, T1_2, T2_1, T3_1, T1_4.....T1_N, T2_P, T3_Q |
| FROM: | T1, T2, T3 |
| WHERE: | T1.primaryKey = T2.primaryKey and |
| | T2.primaryKey = T3.primaryKey and |
| | Condition1, Condition2,...ConditionN |

In the query above, T1 refers to Table 1, T2 refers to Table 2, and T3 refers to Table 3. Further, T1_1 refers to column 1 of Table 1 and T2_1 refers to column 1 of Table 2 and T3_1 refers to column 1 of Table 3, and so on. Thus, the SELECT clause specifies a plurality of result fields from each of the three tables designated in the FROM clause. The WHERE clause includes join logic (e.g., T1.primaryKey=T2.primaryKey) and a plurality of conditions.

Assume that Table 1 has 1500 columns, Table 2 has 500 columns and Table 3 has 1000 columns. This information (i.e., number of columns in each table) may be determined by the table boundary determination unit 116 or contained in the query manager 106 as table boundary metadata 122 (shown in FIG. 2). Assume further that the maximum column count is 750 columns. The maximum column count can be determined by the maximum column count determination unit 118 or contained in the query manager 106 as maximum column count metadata 124 (shown in FIG. 2)

On the basis of a maximum column count of 750 columns, the query manager 106 (and more specifically the column split determination unit 114) must determine whether the above query must be split into a plurality of sub-queries. To make this determination the number of result fields in the SELECT clause is compared to the maximum column count. If the number of result fields in the SELECT clause is greater than the maximum column count, the query manager 106 builds and runs an appropriate number of sub-queries, wherein each of the sub-queries has a maximum number of 750 result fields. Illustrative sub-queries for the exemplary query above are as follows:

| | |
|---|---|
| SELECT: | T1_1..... T1_750 |
| FROM: | T1, T2, T3 |
| WHERE: | T1.primaryKey = T2.primaryKey and |
| | T2.primaryKey = T3.primaryKey and |
| | Condition1, Condition2,...ConditionN |
| And | |
| SELECT: | T1_751..... T1_1500 |
| FROM: | T1, T2, T3 |
| WHERE: | T1.primaryKey = T2.primaryKey and |
| | T2.primaryKey = T3.primaryKey and |
| | Condition1, Condition2,...ConditionN |
| And | |
| SELECT: | T2_1..... T2_500 |
| FROM: | T1, T2, T3 |
| WHERE: | T1.primaryKey = T2.primaryKey and |
| | T2.primaryKey = T3.primaryKey and |
| | Condition1, Condition2,...ConditionN |
| And | |
| SELECT: | T3_1..... T3_750 |
| FROM: | T1, T2, T3 |
| WHERE: | T1.primaryKey = T2.primaryKey and |
| | T2.primaryKey = T3.primaryKey and |
| | Condition1, Condition2,...ConditionN |
| And | |
| SELECT: | T3_750..... T3_1000 |
| FROM: | T1, T2, T3 |
| WHERE: | T1.primaryKey = T2.primaryKey and |
| | T2.primaryKey = T3.primaryKey and |
| | Condition1, Condition2,...ConditionN |

The first sub-query illustrates the generation of the sub-query on the basis of the maximum column count, 750. By comparison, the SELECT clause of the third sub-query specifies only 500 result fields, i.e., less than the 750 column maximum. Thus, the third sub-query illustrates a sub-query generated on the basis of a table boundary, i.e., the table boundary of Table 3. Accordingly, it is contemplated that, for a given query, the respective sub-queries may be generated on the basis of table boundaries and/or the maximum column count.

Further, the SELECT statement in a given sub-query may reference to or more tables. For example, as noted above, the SELECT clause of the third sub-query specifies only 500 result fields, i.e., less than the 750 column maximum. Accordingly, this SELECT clause may have also included T3_1 through T3_250, in which case the SELECT clause of the fourth sub-query would have included T3_251 through T3_1000 and the fifth sub-query would have been eliminated.

It is also contemplated that sub-queries may be user-defined, where such functionality may be made available to the user through the user interface 102 (FIG. 1). For example, assume a MAGE database where a researcher runs a query with over 2000 columns selected but desires to see a gene expression from two specific genes that take up 250 columns from each of two tables. A first sub-query could be generated to include 250 columns from the first table and a second sub-query could be generated to include 250 columns from the second table. The remaining columns could then be split between an appropriate number of sub-queries by table boundaries and/or by the maximum column count.

In some cases, it may be possible to drop selected join operations from the various sub-queries. In some cases, it may be possible to drop selected join operations from a sub-query for the purposes of optimization. Consider, for example, a first and second sub-query in which the conditions do not contain a field from the tables, T1 and T2, selected in the second sub-query. If the join operation of T1 is a left-outer-join with T2, the join operation maybe dropped from the first sub-query if the two tables being selected have a 1 to 1 relationship. However, in some database systems, the presence of the appropriate join logic ensures the correct order of rows in the returned result set. In these cases, removing the join logic would require the addition of some other logic to ensure the correct ordering of rows. For example, once a join operation is dropped from the sub-query, an "order by" clause may be used to synchronize returned rows of data. Other cases of optimization of a sub-query are also contemplated.

Each of the individual sub-queries produces a respective result set upon execution (block 308). Accordingly, FIG. 3 shows five result sets 310, 312, 314, 316, 318. The mapping algorithm 105 of the application 104 (FIG. 1) is then invoked to build (block 320) an index 322 mapping the location of the individual result fields of each of the result sets. As illustrated by the index 322, each result set field is assigned a unique identifier (e.g., CID_1, CID_2, etc). In one embodiment, the index 322 is also representative of the view presented to the user. That is, the arrangement of the output to the user is the same as the view. However, as was noted above the results may be viewed in any desired order, regardless of the index. In one embodiment, the order is dictated by a query engine. For example, the query engine may specify that the results are displayed in the original order in which they are arranged in the base query. In another embodiment, the user specifies a desired order. In any case, the index 322 allows each field in the result sets to be uniquely identified and located. Further, the index allows the fields in the result sets to be viewed in as a singular result set, rather than a plurality of result sets corresponding to each of the sub-queries. Of course, the fields in the result sets may be split up for purposes of facilitating the user's view, but exactly how the fields are split up is not dependent on the sub-queries. Rather, the provision of index allows the order and arrangement of the fields to be manipulated in any desired manner since the index maps the location of the individual result fields of each of the result sets.

In this regard, it is noted that the order in which columns appear in the various sub-queries is not constrained by the base query from which the sub-queries are derived. In other words, it is unnecessary to place the first 1 through N columns of the base query in the first sub-query, the next (N+1) through P columns of the base query in the second sub-query, and so on. In fact, for purposes of optimization this may be undesirable. Accordingly, the order in which columns appear in the various sub-queries may be dependent upon the optimal arrangement. The results may nevertheless be returned to the user in the desired order (i.e., as defined by the user in the base query) by mapping the results to the column order in the base query.

It should be noted that while aspects of the invention have been described with respect to a limitation on the number of columns that can be returned for a single query, embodiments of the invention address other database limitations. For example, limits are typically imposed on the number of bytes that can be in a row. If a given query will return columns that exceed the per row byte limitation, the query may be processed in the manner described above. That is, the query may be replicated to produce N of sub-queries, where no single sub-query requests a result that violates the per row byte limitation.

Abstract Queries

In one embodiment, the base queries are composed and issued as abstract, or logical, queries. An abstract query is composed using logical fields defined by a data abstraction model. Each logical field is mapped to one or more physical entities of data of an underlying data representation (e.g., XML, SQL, or other type representation) being used in the database being queried. Furthermore, in the data abstraction model the logical fields are defined independently from the underlying data representation, thereby allowing queries to be formed that are loosely coupled to the underlying data representation. The abstract query can be configured to access the data and return query results, or to modify (i.e., insert, delete or update) the data. For execution against the database, the abstract query is transformed into a form (referred to herein as a concrete query) consistent with the underlying data representation of the data. Abstract queries and transformation of abstract queries into concrete queries is described in detail in the commonly owned, co-pending U.S. patent application Ser. No. 10/083,075, entitled "APPLICATION PORTABILITY AND EXTENSIBILITY THROUGH DATABASE SCHEMA AND QUERY ABSTRACTION," filed Feb. 26, 2002, which is incorporated by reference in its entirety.

Figure 5:
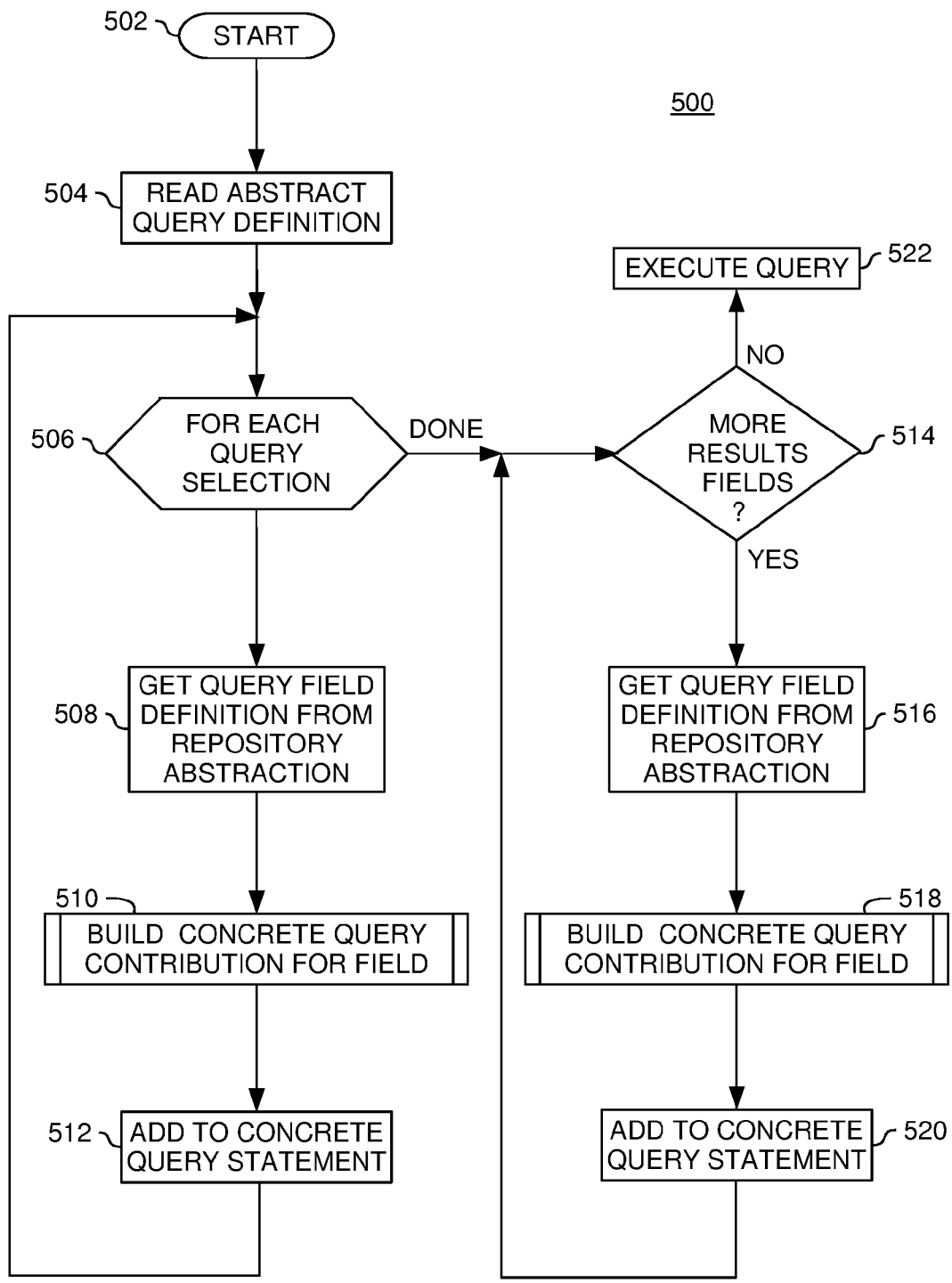
FIGS. 5-6 are flow charts illustrating the operation of a runtime component.
Figure 6:
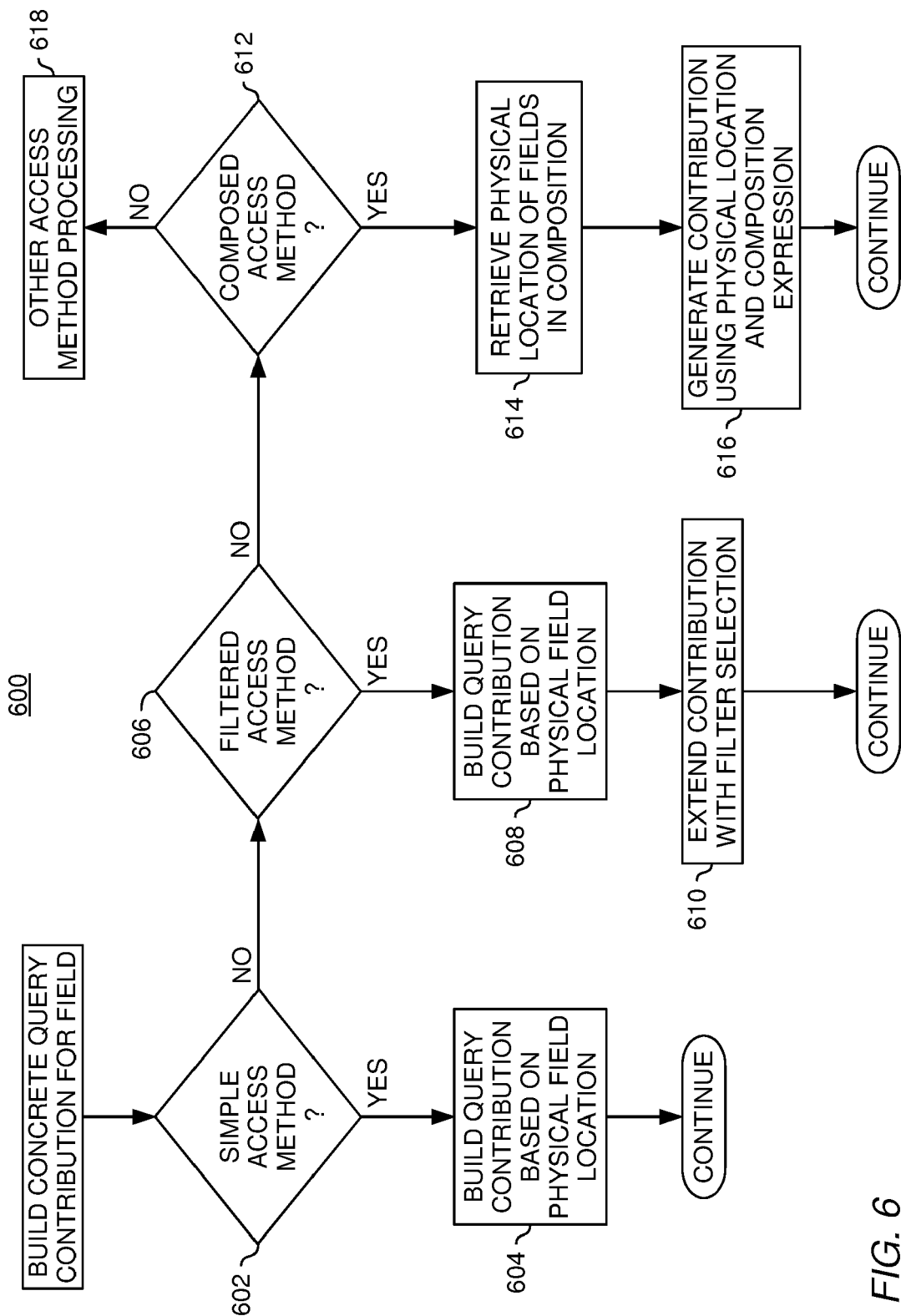

Once issued for execution, a given abstract query maybe split into two or more sub-queries either before being transformed into a concrete query, or after being transformed into a concrete query. In the former case, the processing described in below in FIGS. 5 and 6 is done for each of the sub-queries. In the latter case, the processing described above with respect to FIGS. 2 and 3 is performed on the resultant concrete query.

Figure 4A:
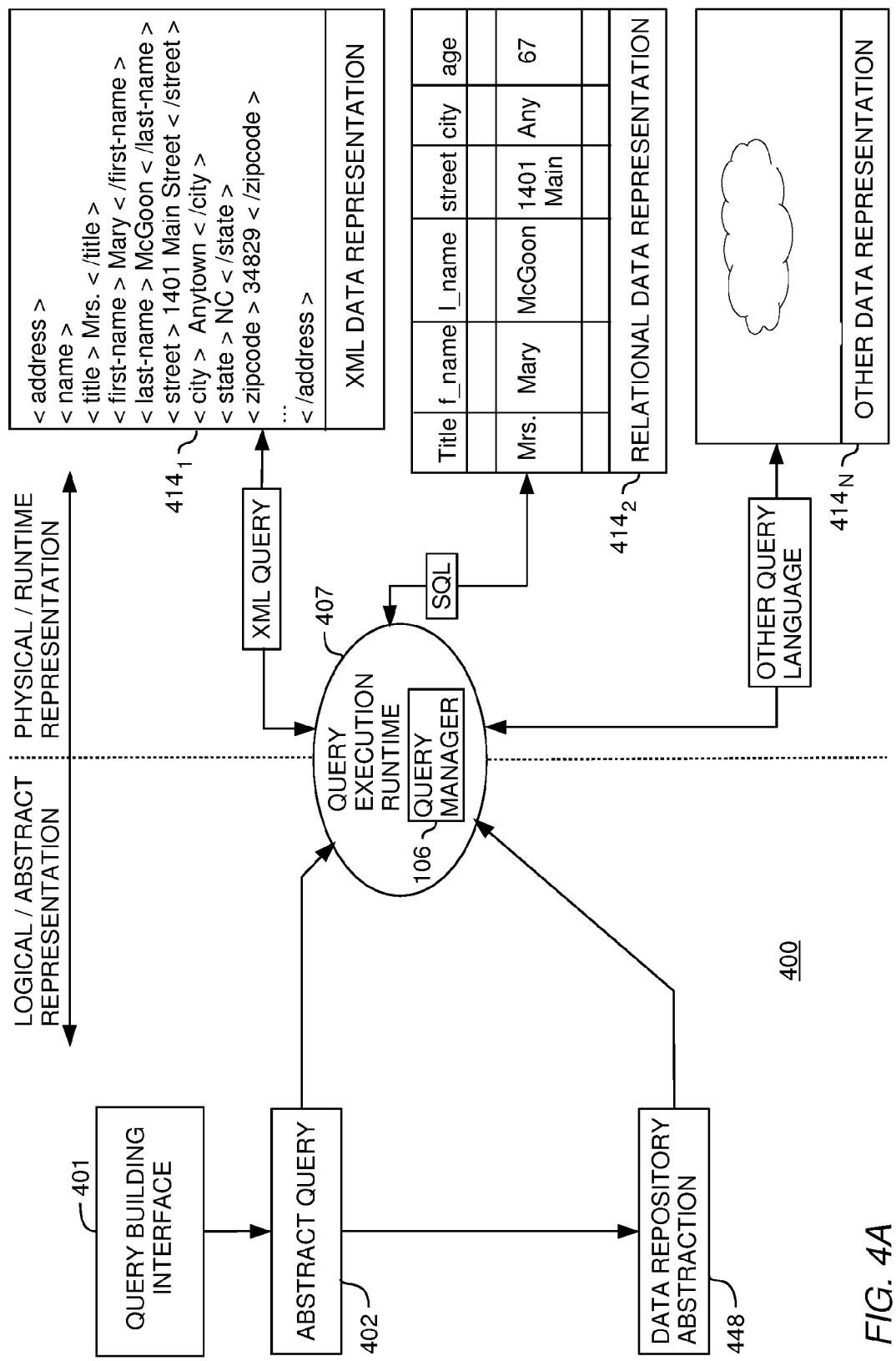
FIG. 4A are relational views of software components for abstract query management.
Figure 4B:
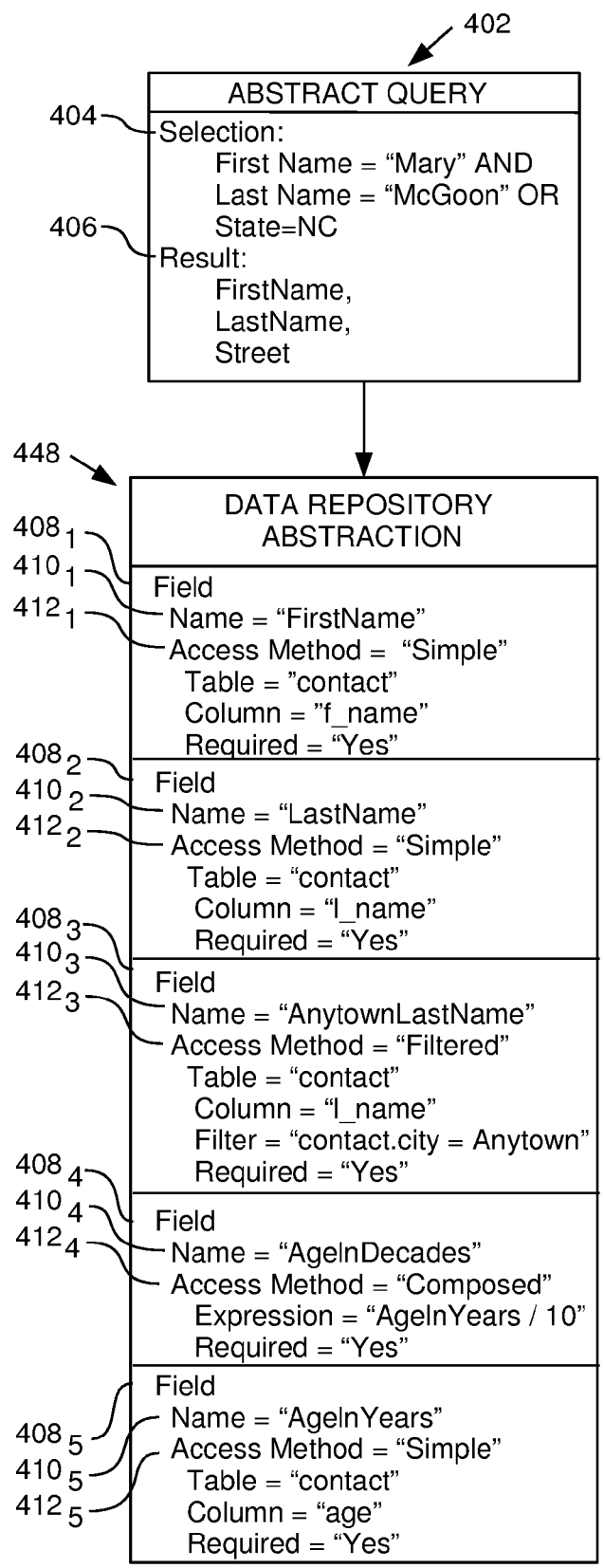
FIG. 4B is a representative data abstraction model.

Details of one embodiment in which abstract queries are used are now described with respect to FIGS. 4-6. Referring first to FIGS. 4A-B, a plurality of interrelated components cooperating for the composition, issuance and transformation of abstract queries are shown. A query building interface 401 is a user interface configured to allow users to compose and issue abstract queries which are transformed and then executed against a database (e.g., one of the databases 110 in the database environment 108). A given abstract query 402 may be have been composed by a user during a current session or may be a saved query retrieved from storage. The issued query 402 is referred to herein as an "abstract query" because the query is composed according to abstract (i.e., logical) fields rather than by direct reference to the underlying physical data entities in the database. As a result, abstract queries may be defined that are independent of the particular underlying data representation used. In one embodiment, the query 402 may include both criteria used for data selection (selection criteria 404) and an explicit specification of the fields to be returned (return data specification 406) based on the selection criteria 404 (shown in FIG. 4B).

The logical fields used to compose the abstract query 402 are defined by a data repository abstraction component 448. In general, the data repository abstraction component 448 exposes information as a set of logical fields that may be used within a query (e.g., the abstract query 402) to specify criteria (i.e., the criteria 404) for data selection and specify the form of result data returned from a query operation (i.e., the return data specification 406). The logical fields are defined independently of the underlying data representation being used in the database, thereby allowing queries to be formed that are loosely coupled to the underlying data representation.

In general, the data repository abstraction component 448 comprises a plurality of field specifications $408_1$, $408_2$, $408_3$, $408_4$ and $408_5$ (five shown by way of example), collectively referred to as the field specifications 408. Specifically, a field specification is provided for each logical field available for composition of an abstract query. Each field specification comprises a logical field name $410_1$, $410_2$, $410_3$, $410_4$, $410_5$ (collectively, field name 410) and an associated access method $412_1$, $412_2$, $412_3$, $412_4$, $412_5$ (collectively, access method 412). The access methods associate (i.e., map) the logical field names to a particular physical data representation $414_1$, $414_2$ ... $414_N$ in a database (e.g., the database 110). By way of illustration, two data representations are shown, an XML data representation $414_1$ and a relational data representation $414_2$. However, the physical data representation $414_N$ indicates that any other data representation, known or unknown, is contemplated.

Any number of access methods is contemplated depending upon the number of different types of logical fields to be supported. In one embodiment, access methods for simple fields, filtered fields and composed fields are provided. The field specifications $408_1$, $408_2$ and $408_5$ exemplify simple field access methods $412_1$, $412_2$, and $412_5$, respectively. Simple fields are mapped directly to a particular entity in the underlying physical data representation (e.g., a field mapped to a given database table and column). By way of illustration, the simple field access method $412_1$ shown in FIG. 4B maps the logical field name $410_1$ ("FirstName") to a column named "f_name" in a table named "contact." The field specification $408_3$ exemplifies a filtered field access method $412_3$. Filtered fields identify an associated physical entity and provide rules used to define a particular subset of items within the physical data representation. An example is provided in FIG. 4B in which the filtered field access method $412_3$ maps the logical field name $410_3$ ("AnytownLastName") to a physical entity in a column named "l_name" in a table named "contact" and defines a filter for individuals in the city of Anytown. Another example of a filtered field is a New York ZIP code field that maps to the physical representation of ZIP codes and restricts the data only to those ZIP codes defined for the state of New York. The field specification $408_4$ exemplifies a composed field access method $412_4$. Composed access methods compute a logical field from one or more physical fields using an expression supplied as part of the access method definition. In this way, information which does not exist in the underlying data representation may be computed. In the example illustrated in FIG. 4B the composed field access method $412_3$ maps the logical field name $410_4$ "AgeInDecades" to "AgeInYears/10." Another example is a sales tax field that is composed by multiplying a sales price field by a sales tax rate.

It is noted that the data repository abstraction component 448 shown in FIG. 4B is merely illustrative of selected logical field specifications and is not intended to be comprehensive. As such, the abstract query 402 shown in FIG. 4B includes some logical fields for which specifications are not shown in the data repository abstraction component 448, such as "State" and "Street."

It is contemplated that the formats for any given data type (e.g., dates, decimal numbers, etc.) of the underlying data may vary. Accordingly, in one embodiment, the field specifications 408 include a type attribute which reflects the format of the underlying data. However, in another embodiment, the data format of the field specifications 408 is different from the associated underlying physical data, in which case an access method is responsible for returning data in the proper format assumed by the requesting entity. Thus, the access method must know what format of data is assumed (i.e., according to the logical field) as well as the actual format of the underlying physical data. The access method can then convert the underlying physical data into the format of the logical field.

By way of example, the field specifications 408 of the data repository abstraction component 448 shown in FIG. 4A are representative of logical fields mapped to data represented in the relational data representation $414_2$. However, other instances of the data repository abstraction component 448 map logical fields to other physical data representations, such as XML. Further, in one embodiment, a data repository abstraction component 448 is configured with access methods for procedural data representations.

An illustrative abstract query corresponding to the abstract query 402 shown in FIG. 4 is shown in Table I below. By way of illustration, the data repository abstraction 448 is defined using XML. However, any other language may be used to advantage.

TABLE I

QUERY EXAMPLE

```
001    <?xml version="1.0"?>
002    <!--Query string representation: (FirstName = "Mary" AND
       LastName =
003    "McGoon") OR State = "NC"-->
004    <QueryAbstraction>
005        <Selection>
006            <Condition internalID="4">
007                <Condition field="FirstName" operator="EQ"
                   value="Mary"
008    internalID="1"/>
009                <Condition field="LastName" operator="EQ"
                   value="McGoon"
010    internalID="3" relOperator="AND"></Condition>
011            </Condition>
012            <Condition field="State" operator="EQ" value="NC"
               internalID="2"
013    relOperator="OR"></Condition>
014        </Selection>
015        <Results>
016            <Field name="FirstName"/>
017            <Field name="LastName"/>
018            <Field name="State"/>
019        </Results>
020    </QueryAbstraction>
```

Illustratively, the abstract query shown in Table I includes a selection specification (lines 005-014) containing selection criteria and a results specification (lines 015-019). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative instance of a data repository abstraction component 448 corresponding to the abstract query in Table I is shown in Table II below. By way of illustration, the data repository abstraction component 448 is defined using XML. However, any other language may be used to advantage.

TABLE II

DATA REPOSITORY ABSTRACTION EXAMPLE

```
001    <?xml version="1.0"?>
002    <DataRepository>
003        <Category name="Demographic">
004            <Field queryable="Yes" name="FirstName"
               displayable="Yes">
005                <AccessMethod>
006                    <Simple columnName="f_name"
                       tableName="contact"></Simple>
007                </AccessMethod>
008                <Type baseType="char"></Type>
009            </Field>
010            <Field queryable="Yes" name="LastName"
               displayable="Yes">
```

TABLE II-continued

DATA REPOSITORY ABSTRACTION EXAMPLE

```
011         <AccessMethod>
012             <Simple columnName="l_name"
                   tableName="contact"></Simple>
013         </AccessMethod>
014         <Type baseType="char"></Type>
015     </Field>
016     <Field queryable="Yes" name="State"
           displayable="Yes">
017         <AccessMethod>
018             <Simple columnName="state"
                   tableName="contact"></Simple>
019         </AccessMethod>
020         <Type baseType="char"></Type>
021     </Field>
022   </Category>
023 </DataRepository>
```

Note that lines 004-009 correspond to the first field specification $408_1$ of the DRA 448 shown in FIG. 4B and lines 010-015 correspond to the second field specification $408_2$. For brevity, the other field specifications defined in Table I have not been shown in FIG. 4B. Note also that Table I illustrates a category, in this case "Demographic". A category is a grouping of one or more logical fields. In the present example, "First Name," "Last Name" and "State" are logical fields belonging to the common category, "Demographic."

Abstract queries are transformed into concrete queries, by a runtime component 407, and then executed. The transformation of abstract queries into concrete queries is described in detail below. In one embodiment, the runtime component 407 is also responsible for splitting queries into sub-queries, as described above. Accordingly, the execution component 407 includes the functions of the query manager 106 of FIG. 1.

FIG. 5 shows an illustrative runtime method 500 exemplifying one embodiment of the operation of the runtime component 407. The method 500 is entered at step 502 when the runtime component 407 receives as input an instance of an abstract query (such as the abstract query 402 shown in FIG. 4B). At step 504, the runtime component 407 reads and parses the instance of the abstract query and locates individual selection criteria and desired result fields. At step 506, the runtime component 407 enters a loop (comprising steps 506, 508, 510 and 512) for processing each query selection criteria statement present in the abstract query, thereby building a data selection portion of a Concrete Query. In one embodiment, a selection criterion consists of a field name (for a logical field), a comparison operator (=, <, <, etc) and a value expression (what is the field being compared to). At step 508, the runtime component 407 uses the field name from a selection criterion of the abstract query to look up the definition of the field in the data repository abstraction 448. As noted above, the field definition includes a definition of the access method used to access the physical data associated with the field. The runtime component 407 then builds (step 510) a Concrete Query Contribution for the logical field being processed. As defined herein, a Concrete Query Contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 110 shown in FIG. 1. The Concrete Query Contribution generated for the current field is then added to a Concrete Query Statement. The method 500 then returns to step 506 to begin processing for the next field of the abstract query. Accordingly, the process entered at step 506 is iterated for each data selection field in the abstract query, thereby contributing additional content to the eventual query to be performed.

After building the data selection portion of the concrete query, the runtime component 407 identifies the information to be returned as a result of query execution. As described above, in one embodiment, the abstract query defines a list of abstract fields that are to be returned as a result of query execution, referred to herein as a result specification. A result specification in the abstract query may consist of a field name and sort criteria. Accordingly, the method 500 enters a loop at step 514 (defined by steps 514, 516, 518 and 520) to add result field definitions to the concrete query being generated. At step 516, the runtime component 407 looks up a result field name (from the result specification of the abstract query) in the data repository abstraction 132 and then retrieves a Result Field Definition from the data repository abstraction 132 to identify the physical location of data to be returned for the current logical result field. The runtime component 407 then builds (as step 518) a Concrete Query Contribution (of the concrete query that identifies physical location of data to be returned) for the logical result field. At step 520, Concrete Query Contribution is then added to the Concrete Query Statement. Once each of the result specifications in the abstract query has been processed, the query is executed at step 522.

One embodiment of a method 600 for building a Concrete Query Contribution for a logical field according to steps 510 and 518 is described with reference to FIG. 6. At step 602, the method 600 queries whether the access method associated with the current logical field is a simple access method. If so, the Concrete Query Contribution is built (step 604) based on physical data location information and processing then continues according to method 500 described above. Otherwise, processing continues to step 606 to query whether the access method associated with the current logical field is a filtered access method. If so, the Concrete Query Contribution is built (step 608) based on physical data location information for some physical data entity. At step 610, the Concrete Query Contribution is extended with additional logic (filter selection) used to subset data associated with the physical data entity. Processing then continues according to method 500 described above.

If the access method is not a filtered access method, processing proceeds from step 606 to step 612 where the method 600 queries whether the access method is a composed access method. If the access method is a composed access method, the physical data location for each sub-field reference in the composed field expression is located and retrieved at step 614. At step 616, the physical field location information of the composed field expression is substituted for the logical field references of the composed field expression, whereby the Concrete Query Contribution is generated. Processing then continues according to method 500 described above.

If the access method is not a composed access method, processing proceeds from step 612 to step 618. Step 618 is representative of any other access methods types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

As described above, it may be necessary to perform a data conversion if a logical field specifies a data format different from the underlying physical data. In one embodiment, an initial conversion is performed for each respective access method when building a Concrete Query Contribution for a logical field according to the method 600. For example, the conversion may be performed as part of, or immediately following, the steps 604, 608 and 616. A subsequent conversion from the format of the physical data to the format of the logical field is performed after the query is executed at step 522. Of course, if the format of the logical field definition is the same as the underlying physical data, no conversion is necessary.

While the foregoing is directed to embodiments of the present invention, other and further embodiments of the invention may be devised without departing from the basic scope thereof, and the scope thereof is determined by the claims that follow.

What is claimed is:

1. A computer-readable storage medium containing a program which, when executed by a processor, performs an operation of processing or managing query executions against a database, the operation comprising:
   receiving, from a requesting entity, a query comprising a plurality of result fields to be returned following execution of the query;
   determining whether the number of the plurality of result fields exceeds a maximum number of columns capable of being returned for a single query; and
   if so:
      creating a plurality of sub-queries, wherein each sub-query includes only a portion of the result fields, not greater than the maximum number of columns capable of being returned, and wherein the portions collectively include all of the result fields of the query;
      executing the plurality of sub-queries in lieu of the query;
      receiving a separate result set for each of the sub-queries;
      returning the results to the requesting entity; and
      mapping the separate result set for each of the sub-queries to a singular output view for presentation to a user; and
   if not:
      executing the query as received from the requesting entity; and
      returning the results to the requesting entity.

2. The computer-readable storage medium of claim 1, wherein N sub-queries are created and wherein the number of result fields in each portion of at least N−1 sub-queries is exactly equal to the maximum number of columns capable of being returned for a single query, wherein N is an integer.

3. The computer-readable storage medium of claim 1, wherein the query specifies two or more tables from which the plurality of result sets is to be retrieved and further comprising:
   creating at least one of the plurality of sub-queries on the basis of table boundaries of the one of the two or more tables, whereby the at least one of the plurality of sub-queries specifies selection of result fields from only one of the two or more tables.

4. The computer-readable storage medium of claim 1, wherein the operation further comprises:
   mapping each result field of the separate result set to a separate column of an output view for presentation to a user.

5. The computer-readable storage medium of claim 1, wherein the operation further comprises:
   mapping each result field of the separate result set to a separate column of an output view for presentation to a user according to an order of the plurality of result fields in the query.

6. The computer-readable storage medium of claim 1, wherein the operation further comprises:
   creating an index that maps each result field of the separate result sets to an output field of a view for presentation to a user, whereby the view includes each of the plurality of result fields of the query.

7. A computer-readable storage medium containing a program which, when executed by a processor, performs a process for processing or managing query executions against a database, the process comprising:
   receiving an abstract query including at least a plurality of result fields, each corresponding to a logical field definition of a data abstraction model abstractly describing the data in the database;
   determining whether the number of the plurality of result fields exceeds a maximum number of columns capable of being returned for a single query;
   if so:
      creating a plurality of sub-queries, wherein each sub-query includes only a portion of the result fields, not greater than the maximum number of columns capable of being returned, and wherein the portions collectively include all of the result fields of the query;
      executing the plurality of sub-queries in lieu of the query;
      receiving a separate result set for each of the sub-queries;
      returning the results to the requesting entity; and
      mapping the separate result set for each of the sub-queries to a singular output view for presentation to a user; and
   if not:
      executing the query as received from the requesting entity; and
      returning the results to the requesting entity.

8. The computer-readable storage medium of claim 7, wherein the process further comprises:
   transforming the abstract query into an executable query for execution against the data in the database.

9. The computer-readable storage medium of claim 7, wherein the executable query is an SQL query.

10. The computer-readable storage medium of claim 7, wherein creating the plurality of sub-queries is done after transforming the abstract query into the executable query.

11. A computer, comprising:
    one or more processors;
    a user interface for composing queries;
    a query manager, which when executed by one or more of the processors, is configured to:
       receive a query composed in the user interface and comprising a plurality of result fields to be returned following execution of the query;
       determine whether the number of the plurality of result fields exceeds a maximum number of columns capable of being returned for a single query;
       if so:
          create a plurality of sub-queries, wherein each sub-query includes only a portion of the result fields, not greater than the maximum number of columns capable of being returned, and wherein the portions collectively include all of the result fields of the query;

execute the plurality of sub-queries in lieu of the query;
receive a separate result set for each of the sub-queries; and
return the results to a requesting entity; and
if not:
execute the query as received from the requesting entity; and
return the results to the requesting entity; and
a mapping algorithm, which when executed by one or more of the processors, is configured to map the separate result set for each of the sub-queries to a singular output view for presentation to a user.

* * * * *